US010114705B1

(12) United States Patent
Kumar et al.

(10) Patent No.: US 10,114,705 B1
(45) Date of Patent: Oct. 30, 2018

(54) PRESENTING VIRTUAL MACHINE BACKUP FILES FOR BLOCK AND FILE LEVEL RESTORE

(71) Applicant: EMC IP Holding Company LLC, Hopkinton, MA (US)

(72) Inventors: Kiran M V Kumar, Karnataka (IN); Vladimir Mandic, San Jose, CA (US); Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 483 days.

(21) Appl. No.: 14/686,438

(22) Filed: Apr. 14, 2015

(51) Int. Cl.
*G06F 17/30* (2006.01)
*G06F 11/14* (2006.01)

(52) U.S. Cl.
CPC ................ *G06F 11/1469* (2013.01)

(58) Field of Classification Search
CPC combination set(s) only.
See application file for complete search history.

(56) References Cited

U.S. PATENT DOCUMENTS

| 9,280,423 | B1* | 3/2016 | Mam | G06F 3/0644 |
| 9,298,561 | B1* | 3/2016 | Sawhney | G06F 11/1469 |
| 9,391,865 | B1* | 7/2016 | Thiam | H04L 43/10 |
| 9,405,482 | B2* | 8/2016 | Varadharajan | G06F 3/0619 |
| 9,424,136 | B1* | 8/2016 | Teater | G06F 3/065 |
| 9,430,332 | B1* | 8/2016 | Bahadure | G06F 11/1451 |
| 2014/0181048 | A1* | 6/2014 | Varadharajan | G06F 3/0619 707/661 |
| 2014/0181438 | A1* | 6/2014 | Varadharajan | G06F 3/0619 711/162 |
| 2015/0127804 | A1* | 5/2015 | Kripalani | H04L 43/10 709/224 |
| 2016/0306558 | A1* | 10/2016 | Varadharajan | G06F 3/0619 |

\* cited by examiner

*Primary Examiner* — Farhan Syed
(74) *Attorney, Agent, or Firm* — Staniford Tomita LLP (57) ABSTRACT

Embodiments are directed to presenting virtual machine backup files for instant restore by creating a virtual volume on a local machine with files that emulate remote VM files, and setting up kernel mode interceptor hook system object and the user mode process for I/O redirection. The virtual volume created and the file extents table is passed as an input to the user mode process. The user mode process waits for events triggered by the kernel mode driver object. If the I/O is within defined file boundaries, the file is converted to relative extents and read from the remote storage node. Write requests are automatically accomplished by attaching a differencing disk created on the local machine to the last known incremental file and performing a native OS mount of that file.

19 Claims, 10 Drawing Sheets

```
┌─────────────────────────────────────────────────┐
│  CREATE VIRTUAL VOLUME WITH FILES THAT EMULATE  │
│  REMOTE VIRTUAL MACHINE FILES ON LOCAL MACHINE  │
│                                                 │
│           - Apply Proper Format                 │
│           - Match File Sizes                    │
│           - Replicate Directory Structure       │
│                                                 │
│                      602                        │
└─────────────────────────────────────────────────┘
```

```
┌─────────────────────────────────────────────────┐
│  SETUP KERNEL MODE INTERCEPTOR HOOK AND USER    │
│         MODE REDIRECTOR PROCESS                 │
│                                                 │
│      - Wait for Events Triggered by Kernel      │
│                                                 │
│      - Handle Reads from Remote Storage Node    │
│           > Use DDBoost or NFS client library   │
│                                                 │
│      - Handle Writes to Remote Storage Node     │
│           > Attach differencing disk to last incr. file │
│           > Native OS mount of the file         │
│                                                 │
│                      604                        │
└─────────────────────────────────────────────────┘
```

PRESENTING VIRTUAL MACHINE BACKUP FILES FOR BLOCK AND FILE LEVEL RESTORE

CROSS-REFERENCE TO RELATED APPLICATIONS

The present application is related to U.S. patent application Ser. No. 14/686,650 filed Apr. 14, 2015 and entitled "Mountable Container Backups For Files," U.S. patent application Ser. No. 14/686,468 filed Apr. 14, 2015 and entitled "Block Changes Framework for Delta File Incremental Backup,", and U.S. patent application Ser. No. 14/686,400 filed Apr. 14, 2015 and entitled "Virtual Machine Block and Snapshot Consolidation," all assigned to the assignee of the present application, and each incorporated herein by reference in its entirety.

TECHNICAL FIELD

Embodiments are generally directed to networked-based data backup, and more specifically to backing up virtual machines for instant restoration.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Data protection and comprehensive backup and disaster recovery (DR) procedures become even more important as enterprise level networks grow and support mission critical applications and data for customers.

The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. Although disaster recovery procedures provide a reliable method of backing up critical enterprise data, most DR processes take a large amount of time to recover. Even in newer networks that utilize disk-based targets, the time to recover can remain significant, and may not meet the recovery time objectives (RTOs) and recovery point objectives (RPOs) of today's business needs. One main drawback is that during disaster recovery, present methods still require blocks to be copied from the virtual hard disk files (e.g., VHDx) to the host disks.

Providing availability of virtual machine backup files for instant system restore requires newer data restoration techniques. One common approach is to mount the virtual machine directly from the machine/server where the backup file is present. This involves making the file on the remote machine accessible to the server via standard network-based file sharing protocols like CIFS/NFS (Common Internet File System/Network File System). This requires additional configurations to be made on the remote machine side, thus adding significantly to administrative overhead. Furthermore, different backup platforms support different file sharing protocols. For example, Unix-based operating systems support NFS, while operating systems, such as the Microsoft Windows operating system, do not support NFS-based network file share protocols, but instead support the CIFS protocol. A popular backup platform, such as the EMC Networker backup system supports UNIX as a storage node to interface it from Windows-based systems, and thus require an interface to the NFS protocol, and Networker currently has support to interface with NFS servers via client library. However, resolving different network transfer protocols is a challenge for backup solutions that rely on network share through a specific file transfer protocol.

What is needed, therefore, is a DR restore method that provides for instant system restoration without requiring a network share of the remote virtual machine hard disk files and without changing the original backup files.

What is further needed is a system that provides disaster recovery restoration that meets aggressive RTO and RPO requirements of enterprise networks and large-scale organizations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of performing data backup in a virtual machine network for VMs with virtual hard disk formats to provide a data recovery process that provides instant availability of VM backup files without requiring network share, and that can be used as part of a disaster recovery solution for large-scale networks.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
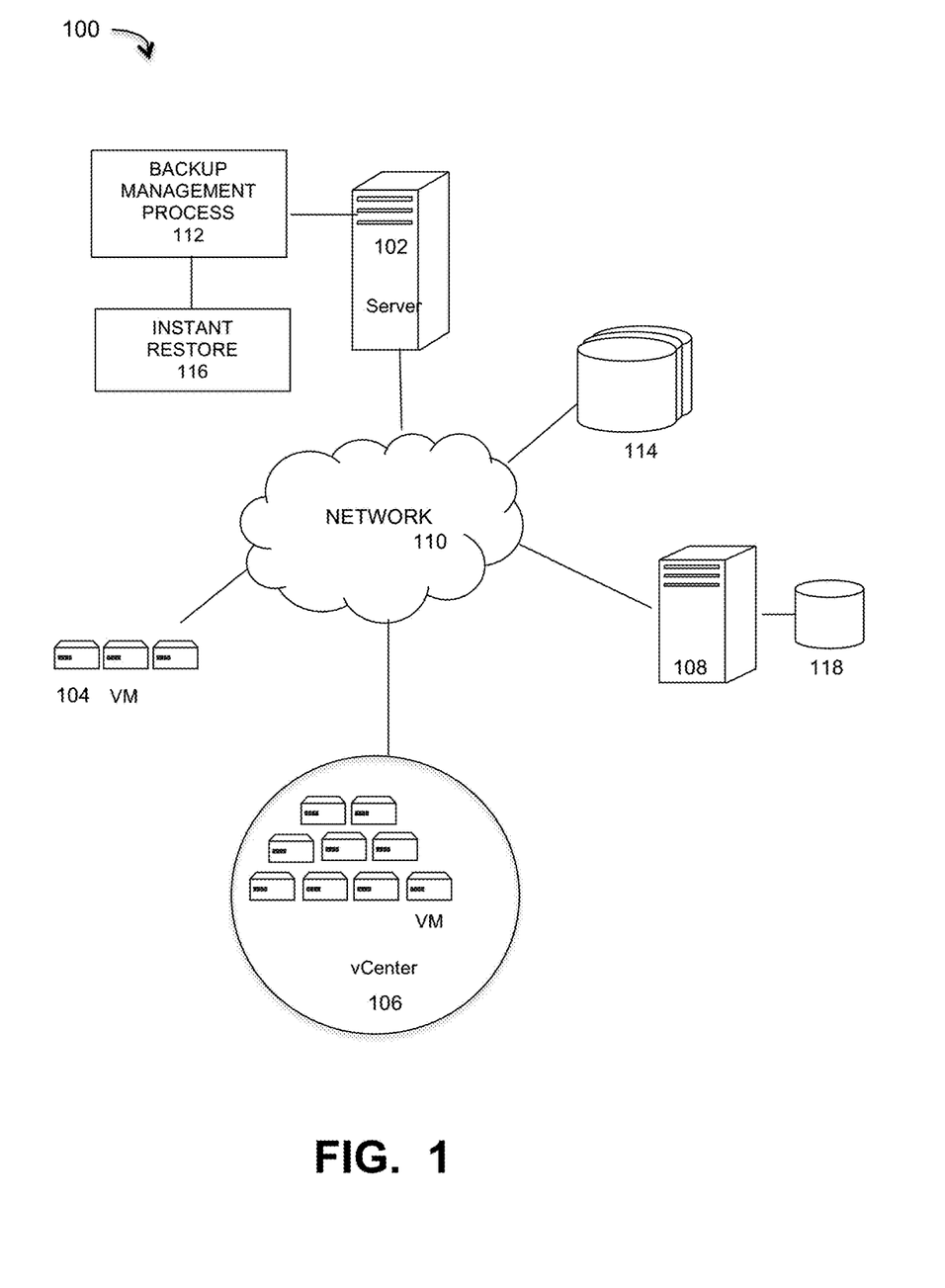
FIG. 1 is a diagram of a large-scale network implementing a data recovery process that provides instant availability of VM backup files without requiring network share, under some embodiments.

FIG. 1 illustrates a computer network system 100 that implements one or more embodiments of an instant restore process for an automated disaster recovery and replication system for virtual machine (VM)-based backup systems. In system 100, a number of VMs or groups of VMs 104 are provided to serve as backup targets. Target VMs may also be organized into one or more vCenters 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a data backup/DR process with recovery capabilities based on data recover or data restore techniques. The management process 112 automates the backup and/or replication/restore of network data using the target VM devices. The instant restore process 116 provides for the ready and instant availability of virtual machine backup files without the use of file share protocols to access remote virtual machine hard disk files, and without changing the original backup file.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

As is known, virtual machine environments utilize hypervisors to create and run the virtual machines. A computer running the hypervisor is a host machine and all virtual machines are guest machines running guest operating systems (OS). The hypervisor provides the guest OSs with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper V implements isolation of virtual machines in terms of a partition, which is a logical unit of isolation, supported by the hyper-visor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. Differencing VHDx's can be created which will have internal references to parent VHDx. In general, block based backups bypass files and file systems almost completely. The operating system file system divides the hard disk, volume or RAID array into groups of bytes called blocks (fixed size) or extents (variable size), which are typically ordered 0-N.

Figure 2:
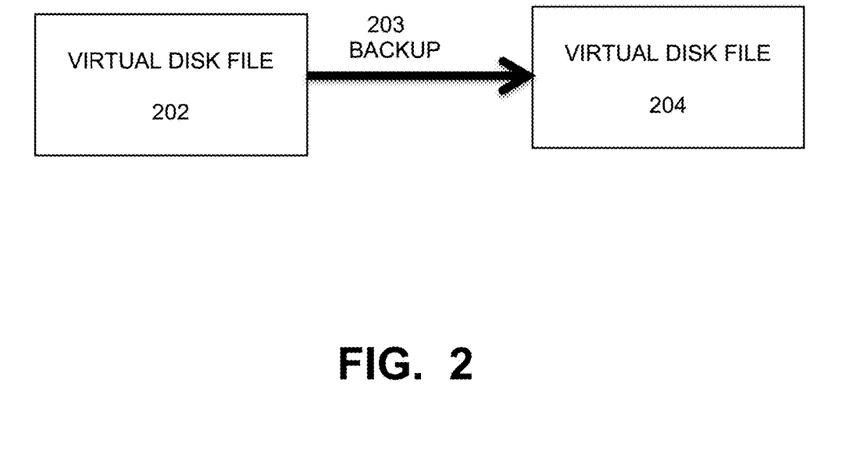
FIG. 2 illustrates an example virtual disk that may be used in a backup operation, in accordance with some embodiments.

FIG. 2 illustrates an example virtual disk that may be used in a backup operation, in accordance with some embodiments. As shown in FIG. 2, a volume may be configured to store information that needs to be backed up through a backup operation 203. For example, the volume may be associated with a database or repository or other data source, and may be referred to as a parent volume. In an embodiment, the backup process 112 backs up a virtual machine, which are represented as virtual disks. Thus, as shown in FIG. 2, virtual disk file 202 is backed up by operation 203 to virtual disk file 204. File 204 may be configured to store any and all back up information related to the virtual disk file 202. The file 204 may be created based on a virtual disk format and may contain information typically contained in a physical volume.

For some embodiments, the file 204 may be created based on the Hyper-V Virtual Hard Disk (VHDX) format according to the VHDX Format Specification, published by Microsoft Corp. The file 204 may be referred to as a VHDx file and may be mounted by an operating system that supports VHDx files. One example of such an operating system is the Microsoft Windows Server 2012 by Microsoft Corp. The file 204 may be configured to store full backup information of a parent volume (e.g., volume 202). For some embodiments, the backup operation that backs up the parent volume to the file 204 may be performed using a block based backup (BBB) operation. In a block based backup, the information may be read from the parent volume block by block regardless of the number of files stored in the parent volume. The backup operation may take an image of the parent volume without having to refer to the file system associated with the parent volume.

For some embodiments, one or more differential or incremental backup virtual disks may be created using the virtual disk format. The incremental backup virtual disks may be created after the creation of the file 204, which stores the full backup information of the parent volume. The incremental backup virtual disks may store only the changed blocks in the parent volume. The set of a full backup virtual disk and one or more incremental backup virtual disks may be saved together as a single virtual disk (e.g., VHDx) in a backup medium such as disk or disk array and can be mounted for recovery. The full backup virtual disk and the incremental backup virtual disks may be linked to their parent volume.

The number of incremental backup virtual disks that can be created may be limited by the availability of system resources. Further, as the number of the incremental backup virtual disks increases, the performance of the restore operations may decrease.

The full backup information in the full backup virtual disk and the one or more incremental backup information in the incremental backup virtual disks may be merged together to form merged backup information which may then be saved in a backup medium. The merged backup information may be stored as a virtual disk (e.g., a VHDx) and may include merged sections of the full backup virtual disk and one or more incremental backup virtual disks. In an embodiment, the backup manager process merges the base and its differencing disks on the fly (i.e., during runtime execution of the backup operations) and creates one single image stream representing the merged content. Subsequent incremental backups also can take single differencing disk or multiple differencing disks for merging and creates a link that connects to the parent backup image on the remote machine.

Figure 4:
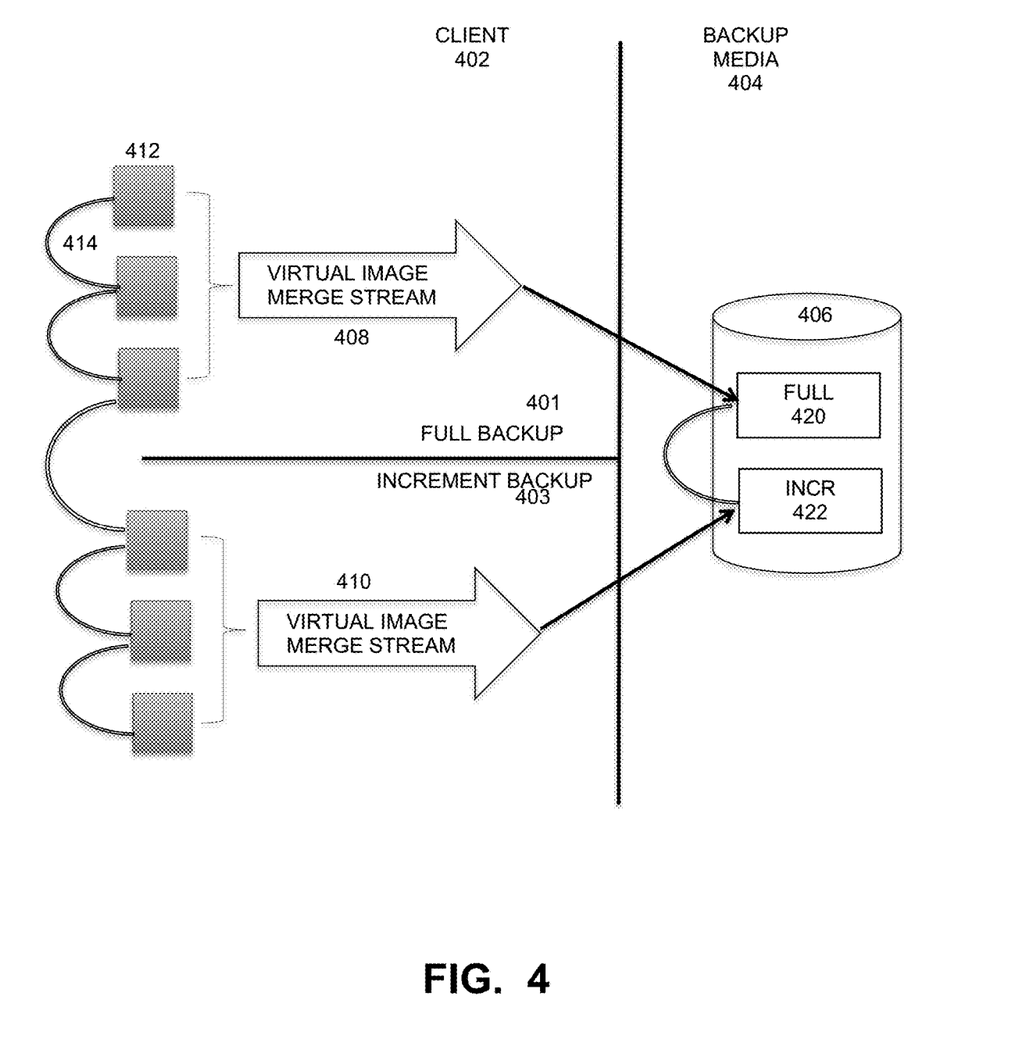
FIG. 4 illustrates the process of merging base and differencing disk chains, under an embodiment.

FIG. 4 illustrates the process of merging base and differencing disk chains, under an embodiment. FIG. 4 illustrates an Hyper-V backup architecture in which parent image files 412 are linked to child image files through links 414. In the case of a full backup 401, a virtual image merge stream 408 from the image files is derived on the client side 402 and stored on the backup media side 404 as a full backup file 420 on physical disk 406. Likewise, in the case of an incremental backup 403, a virtual image merge stream 410 from the image files is derived on the client side 402 and stored on the backup media side 404 as an incremental backup file 422 on physical disk 406. This mechanism allows a differencing disk at each user snapshot to be merged together so that a single backup copy is maintained. This helps reduce the space required to store the backups. After save set consolidation, the differencing disk representing the incremental backups are merged to a single backup. This is significantly different than present known processes in which a differencing disk created at each user snapshot must be backed up, and the differencing disk at each level of the chain must be maintained as separate backups thereby increasing the number of resources to maintain, such as index, media, and storage database requirements.

Figure 5:
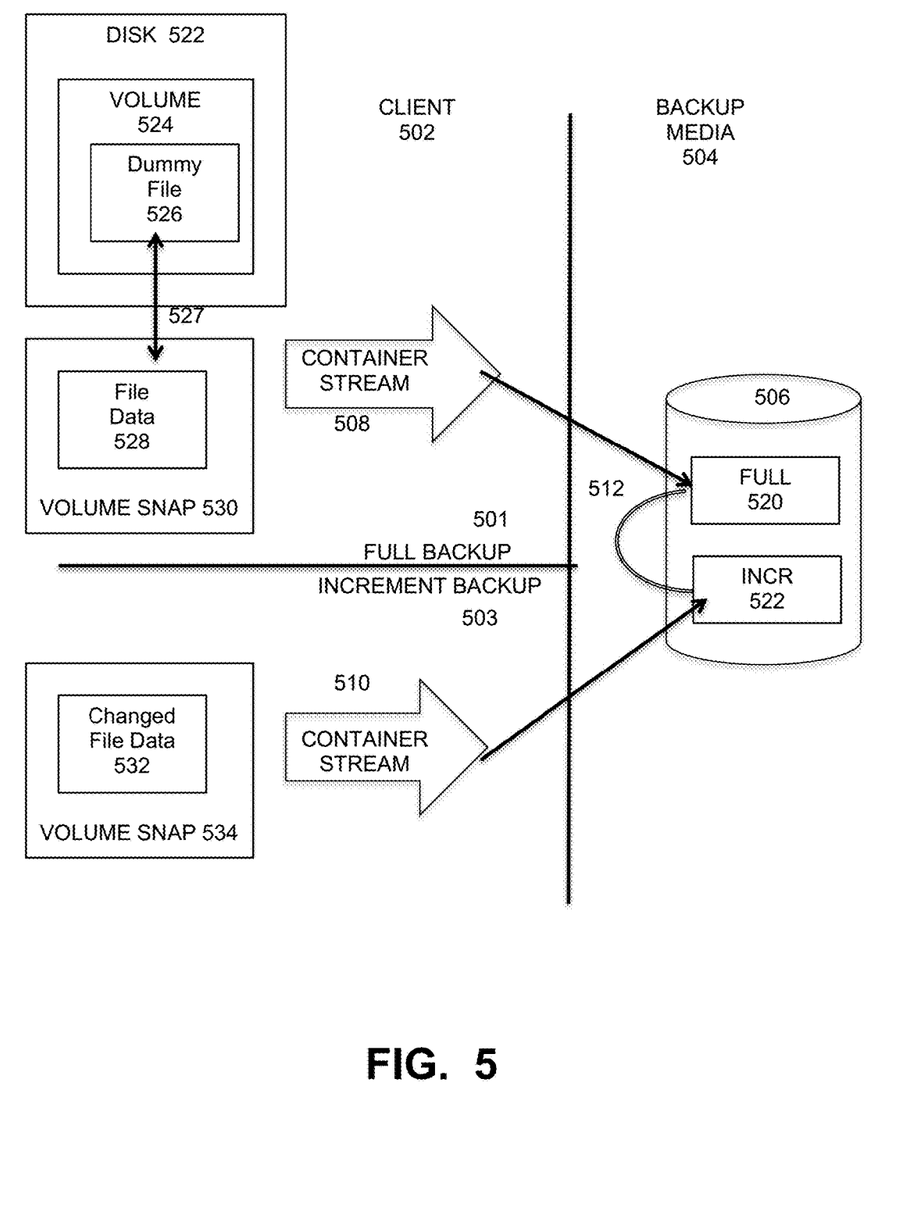
FIG. 5 is a block diagram showing the overall process of a container based mountable single file backup including an incremental virtual file backup.

Under an embodiment, the full and incremental block backups of FIG. 4 use a container-based mountable backup technique. FIG. 5 is a block diagram showing the overall process of a container based mountable single file backup including an incremental virtual file backup, under such an embodiment. As shown in FIG. 5, client 502 sources data to be backed up to backup media 504 including disk 506. At a time T0 a full backup 520 of a particular file is performed. To perform the full backup, there can be a volume snapshot 530 of the source volume which includes data of a file 528 for backup. A template or dummy virtual disk 522 is created along with a dummy volume 524 and dummy file 526. In other words, a backup volume is created on the client machine 502 with the required parameters for which the file is to be backed up. In particular, in a specific embodiment, a virtual disk of a dummy VHD/VHDx container is created at the client. An NTFS or ReFS volume is created on the disk. A dummy file 526 is created within the volume that represents the file to be backed up. The dummy file, however, is not a copy of the file to be backed up because the dummy file will not include the file data.

File blocks are redirected depending on whether the backup of a particular block is associated with metadata (e.g., virtual disk information, or volume information of the virtual disk) or actual data of the file. If the block is associated with metadata, the backup reads from the virtual disk. If the block is associated with actual file data, the read is from the source volume. The block is then streamed in a container stream 508 to the backup media 508 and stored as a full saveset 520 on drive 506. The full saveset may be referred to as a parent. During the container streaming of the VHD/VHDx container, the system interprets, analyzes, or examines a particular extent of the VHD/VHDx stream. If the particular extent is associated with the dummy file, rather than reading from the dummy file, the system reads from the file data that is residing on the volume snapshot.

A snapshot of the volume may be taken to initiate changed block tracking of the volume. After time T0, changes may be made to the file. For example, information may be added to the file, deleted or removed from the file, modified or altered in the file, or combinations of these. At a time T1, after time T0, an incremental virtual file backup 503 is performed. To perform the incremental backup, there can be another volume snapshot 534 of the source volume which includes changed file data 532. During an incremental backup a dummy file corresponding to the file to be incrementally backed up does not have to be created because the system stores or can determine exactly where the file starts in the full or parent VHD/VHDx. In other words, the structure associated with the file has been stored in the previous full backup of the file. Thus, the data blocks to be streamed in an incremental backup can include the blocks of the file and blocks associated with metadata of the file (e.g., directory structure information, disk information, or volume information) can be excluded from the stream. The set of changed blocks since the previous backup of the file at T0 are filtered to identify changed blocks associated with the file and exclude other changed blocks of the volume not associated with the file to be backed up. The changed data blocks of the file are streamed in a container stream 510 to the backup media 504 and stored as an incremental VHD/VHDx on disk 506 in an incremental saveset 522. The incremental saveset may be referred to as a child and is linked or associated 1380 to the full or parent saveset 520.

As shown with reference to FIGS. 4 and 5, the backup management process (backup manager) 112 creates a link between the child virtual container with the parent container. In a step, the backup manager streams the child virtual container data and file data to the target (e.g., backup media). In particular, the backup manager prepares an incremental target volume stream in reference to previous backup, links to the previous backup, and places file blocks as appropriate with respect to the target stream.

Presenting VM Backup Files for Instant Restore

Figure 3:
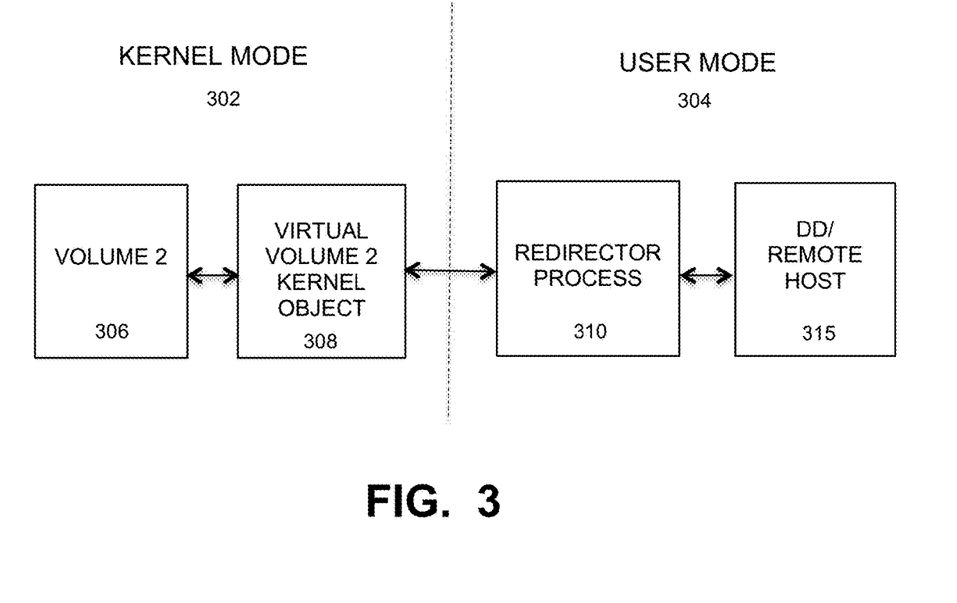
FIG. 3 is a block diagram illustrating the main functional components of a backup system, under an embodiment.

In an embodiment, the backup manager process is configured to take advantage of the fact that Hyper-V files are already in VHD and VHDX format. As such, the backup process does not create an additional container for Hyper-V files during backup time, but instead it creates it during restore time and presents the backup files on the virtual container. In an embodiment, the process serves to emulate the virtual machine backup files present in the remote machine as if it were present on the local machine in a local volume, which is formatted with known file system such as NTFS using native protocols such as DDBOOST for DD and custom NFS client library for UNIX storage servers. With reference back to FIG. 3, which is a block diagram illustrating the main functional components of a backup system, the backup manager includes a kernel mode volume redirector driver 308 residing in the kernel mode 302, and a corresponding user mode 304 redirector process 310, which handles the I/O requests from the kernel mode driver object. The user mode redirector process 310 communications with the DD/remote host 320, and the kernel mode volume redirector driver 308 reads the data volumes 306. FIG. 3 illustrates an example case of a VHD/VHDx having one partition/volume (denoted Volume 2) within the disk.

Figure 6A:
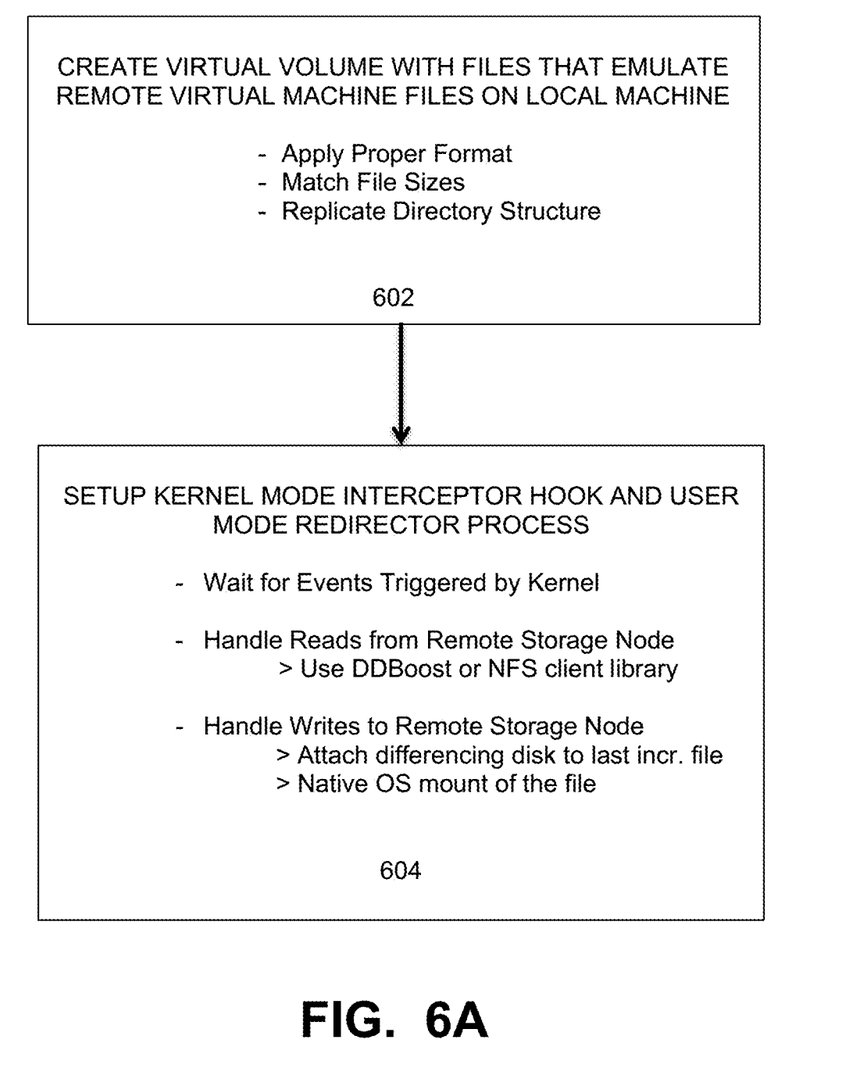
FIG. 6A is a flow diagram illustrating basic steps of presenting VM backup files for block and file level restore, under an embodiment.

FIG. 6A is a flow diagram illustrating basic steps of presenting VM backup files for block and file level restore, using the components of FIG. 3, under an embodiment. As shown in FIG. 6A, the overall method comprises two main steps of creating a virtual volume on a local machine with files that emulate remote VM files, 602; and setting up kernel mode interceptor hook and user mode redirector process, 604.

Figure 6B:
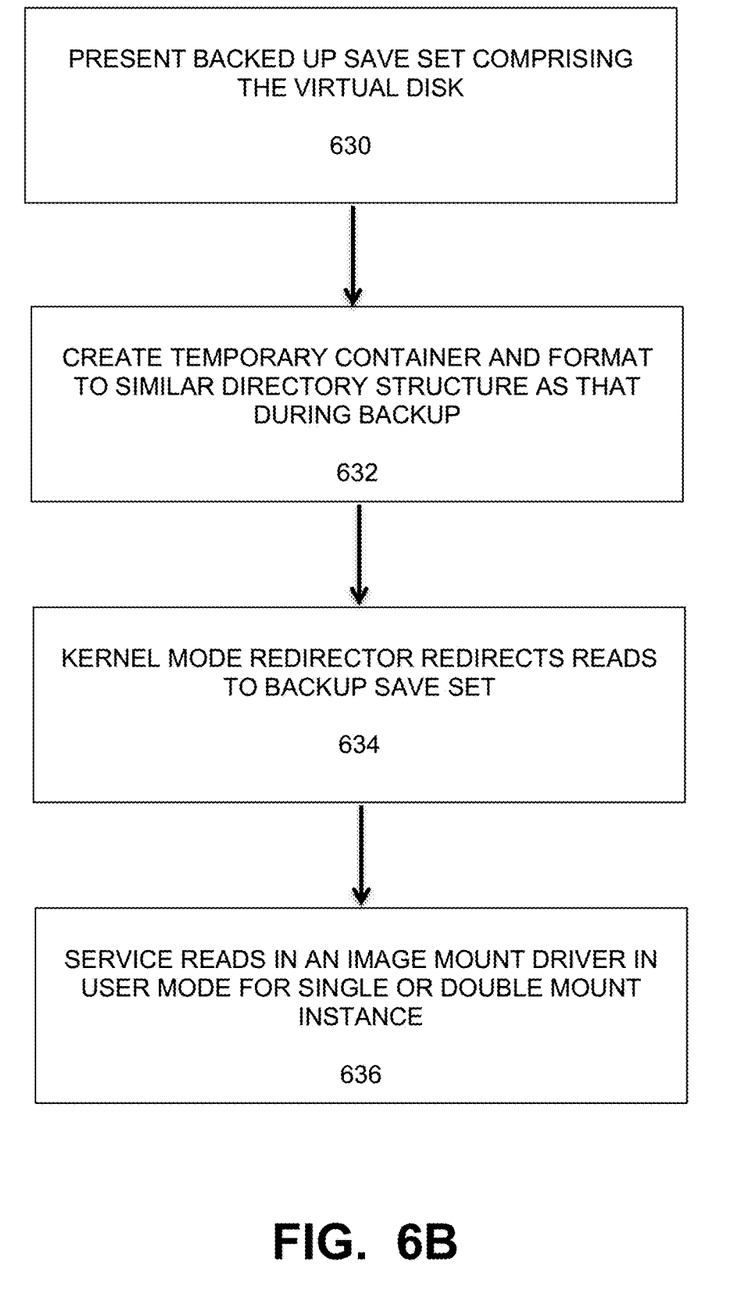
FIG. 6B is a flow diagram of performing a recover, under an embodiment.

As noted above, since the virtual disks comprising a VM are already in the VHD/VHDx format, they are backed up directly, so they do not necessarily need to be put in a new container during backup. FIG. 6B is a flow diagram of performing a recover, under an embodiment. During recover, the method presents the backed up save set comprising the virtual disk, step 630. A temporary container (virtual disk) is created as in step 632. It is formatted, and a directory structure similar to the one during backup is created. Then the kernel mode redirector component 308 is used to redirect reads to the backup save set residing either on a DD or NFS, etc., step 634. In an embodiment, read operations are services in an image mount driver in user mode, step 636. A VHD image mount driver can be used for single mount operations or double mount operations using the native OS mount for instances where a disk contains more than one volume, as described in greater detail below.

Mounting Disk Image Backups

Mounting disk images on Windows is an important aspect of File Level Recovery (FLR). In case of file based backups, FLR solutions typically employ a file system parser module which reads index information (generated during the actual backup), to present a browse able view to the users for granular recovery. On the other hand, when backup is done at the volume level (block based backup), mounting backup images using the native mount capability of the underlying operating system makes more sense instead of using a file system parser to generate indexes for the entire volume. In most implementations, the Windows operating system has a native VHD image mount driver (vhdmp.sys). This is a Windows system component and is responsible for mounting the file system (NTFS) instance that resides inside the disk image (VHD files). The native VHD image mount, as supported by vhdmp.sys, is limited to the case when the VHD file itself is residing on either an NTFS volume or a CIFS share. It cannot, for example, mount a VHD file residing on say, an FTP server. Secondly it only supports VHD image file format as the container for the file system data.

Embodiments are include a method that makes it possible to mount an arbitrary disk image (VHD, VMDK, VDI, etc.) on Windows operating systems. These image files can be physically present on any arbitrary location like FTP server, SFTP server or even a Web server. The implementation consists of a kernel mode driver and a user mode application, as shown in FIG. 3. The kernel mode driver 308 in its driver entry routine creates a device object of the type FILE_DEVICE_DISK. This is the seed which initiates the FSR (File System Recognizer) component of the operating system responsible for detecting the type of file system contained inside the media which is in the process of being mounted.

When the I/O manager finds a device object for a physical media device (that is, a device with the type FILE_DEVICE_DISK) that device object will have a volume parameter block (VPB) which will indicate if the volume has been mounted. If it has been mounted, the VPB will point to the device object belonging to the file system. If it has not been mounted, the I/O Manager will attempt to mount it by invoking the FSR. The process of mounting consists of I/O Manager calling each registered file system to claim support for the volume inside the media. This is done by calling the file system's IRP_MJ_FILE_SYSTEM_CONTROL dispatch entry point with the minor function code IRP_MN_MOUNT_VOLUME. The I/O Manager then asks each file system in turn if the volume can be mounted by that particular file system, where IRP is an I/O request packet for Windows drivers.

File systems are called in last registered first called order. The IRP_MN_MOUNT_VOLUME handler for each file system attempts to read their file system recognition structures from the on-media data by initiating IRP_MJ_READ requests to the underlying disk/media. If all checks are successful, the file system driver claims ownership of the volume and the File System Recognition phase is over.

Figure 7:
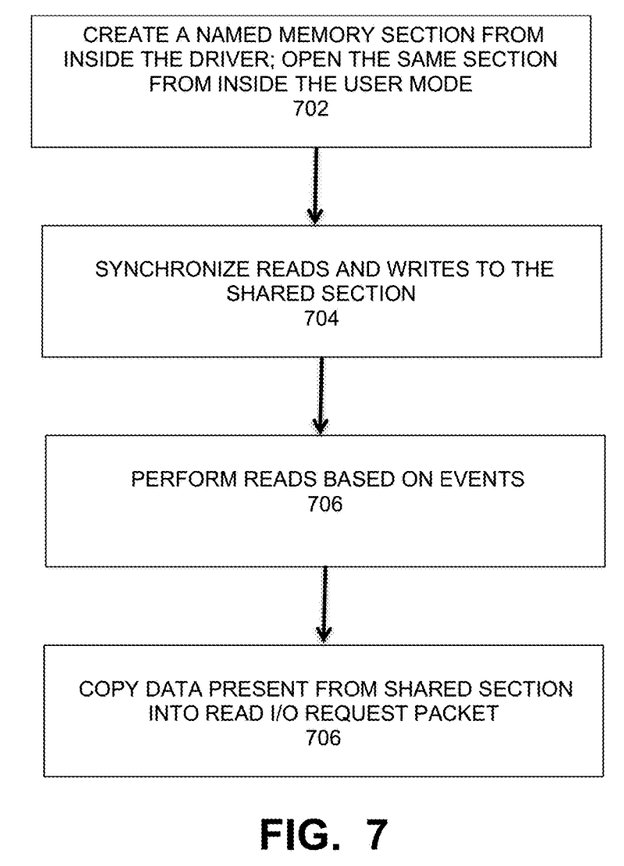
FIG. 7 illustrates a method of mounting disk image backups, under an embodiment.

The IRP_MJ_READs targeted on the device object to query recognition information are serviced in the driver's IRP_MJ_READ dispatch handler. The implementation of this handler typically issues a ZwReadFile kernel API against a local disk based image file that contains the volume data. In an embodiment, the process does not do a flat file read on a local disk based or CIFS-based file (both of which can be done by a kernel mode API.) Instead, the method does a process of mounting disk image backups such as that illustrated in the flowchart of FIG. 7. First, the process creates a named memory section from inside the driver and opens the same section from inside the user mode, step 702. It then synchronizes reads and writes to the shared section using two named kernel event dispatcher objects, step 704. The process then processes reads based on events, which may or may not involve waiting, step 706. The kernel mode driver does the following in response to an IRP_MJ_READ: (1) copies the read offset and the length to read into the shared section; and (2) process signals event 1 and start waiting for event 2 to become signaled. A dedicated "READ thread" in the user mode application, waiting on event 1, would yield from its wait state because of event 1 transitioning into signaled state and would then proceed to do the following. First, it performs the actual read operation on the image file taking the offset and length currently mentioned in the shared section. The output buffer of this read operation would be the beginning of the shared section. The read operation itself can essentially be anything i.e. any type of read on a file abstraction that supports seeking, such as FTP, SFTP, DD Boost, and so on. The user mode thread would "present" length bytes of data from the requested offset into the shared section and then signal event 2 which would signify the end of read operation from user mode. Once the read is over and the user mode read thread signals event 2, the kernel thread (IRP_MJ_READ dispatch routine) waiting on event 2 would yield and would copy the data present from the shared section directly into the irp->MdlAddress member of the read IRP and eventually complete the read request by calling IOCompleteRequest, step 708.

The disclosed method essentially changes the way IRP_MJ_READs are serviced by an image mount driver. Instead of servicing the read request in the kernel mode, while the IRP_MJ_READ dispatch handler is executing (which is restrictive in terms of the available file access API)

embodiments of the mechanism moves this task to the user mode which has much better support for such file based APIs. For example Data Domain's boost read API call, which rehydrates the de-duped data is a file-based API that operates only in user mode. A kernel mode port for DD Boost is not available. In an embodiment, a "ddp_read" function exposes a combined read/seek interface which is functionally equivalent to regular C runtime read/seek interfaces. The "ddp_read" function reads a file which is present on a data domain system's storage unit.

An example structure for the DDP_read function is as follows:
ddp_read(ddp_file_desc_t fd, char*buf, ddp_uint64_t count, ddp_int64_t offset, ddp_uint64_t*bytes_read); where:
fd[in]: File Descriptor to use for reading.
buf[out]: Pointer to read buffer.
count[in]: Number of bytes to read.
offset[in]: File offset to read from.
bytes_read[out]: Number of bytes read after successful call to 'ddp_read'.

Similarly there are many user mode FTP libraries that allow programmatic access to data stored on FTP servers. The user mode read thread which services the IRP_M-J_READ IRPs can very well make use of these user mode FTP libraries to satisfy mount driver's read request on disk image data. This is also true for Web servers. Basically, image file mounts are facilitated using the method if the server that hosts the image is capable of presenting a file read/seek abstraction. Furthermore the use of shared memory section and event dispatcher objects ensures that there is very minimal performance impact, in that the performance is generally no worse than the performance of the underlying file access API used to service the read request from user mode. In some implementations, this can further be improved by introducing user mode caching of the file data based on the nature of the underlying transport.

Although embodiments are described with respect to specific function names and code portions, it should be noted that these are provided primarily as examples and implementation within a certain version of the Windows operating system, and embodiments are not so limited and cover other alternative function names, code portions, and OS implementations.

For some embodiments, one or more differential or incremental backups for Hyper-V backups in which the data to be backed up is already in a virtual disk format, such as VHD/VHDx. The incremental backup virtual disks may be created after the creation of the file that stores the full backup information of the parent volume. The incremental backup virtual disks may store only the changed blocks in the parent volume. The set of a full backup virtual disk and one or more incremental backup virtual disks may be saved together as a single virtual disk (e.g., VHDx) in a backup disk and can be mounted for recovery. The full backups and incremental backups comprise virtual disk files, which are merged to create an artificially synthesized full backup.

Figure 8:
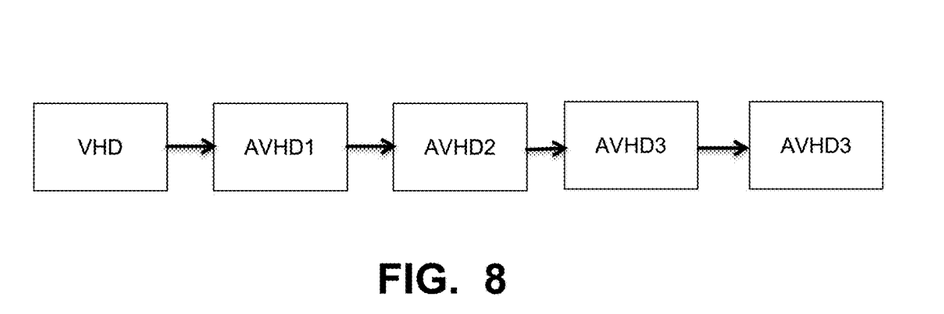
FIG. 8 illustrates a linear chain of snapshots that can be used in a mount or double mount technique for an instant recovery method, under an embodiment.

In general, whenever a Hyper-V backup operation is initiated to backup a VM, for each virtual disk comprising a VM, a differencing disk denoted as AVHD/AVHDX, is created to capture future writes to the virtual disk. An AVHD (or AVHDX) file is essentially a differencing disk that is a child of another VHD (or VHDX) AVHD means an automatically managed VI-ID that is managed by Hyper-V. VHD/VHDX and AVHD/AVHDX use the same file format. The AVHD is a snapshot differencing disk file, where a snapshot is an image of the system at a point in time where the current running configuration of the virtual machines is saved to the AVHD. In general, then the AVHD is created, the original VHD is no longer modified and the snapshots are merged with the original VHD only when it is powered off. For disaster recovery usage, it may be preferable to manually merge snapshots. In certain implementations, this is done by changing file extensions (e.g., changing the extension of the newest AVHD file to VHD) so that any AVHD will always go to its parent, not the root parent. A linear chain of snapshots can then be built, as shown in FIG. 8 in which for the chain: VHD-AVHD1-AVHD2-AVHD3-AVHD4, AVHD4 is the newest and AVHD1 is the oldest. FIG. 8 illustrates a linear chain of snapshots that can be used in a mount or double mount technique for an instant recovery method, under an embodiment.

Double Mount

Figure 9:
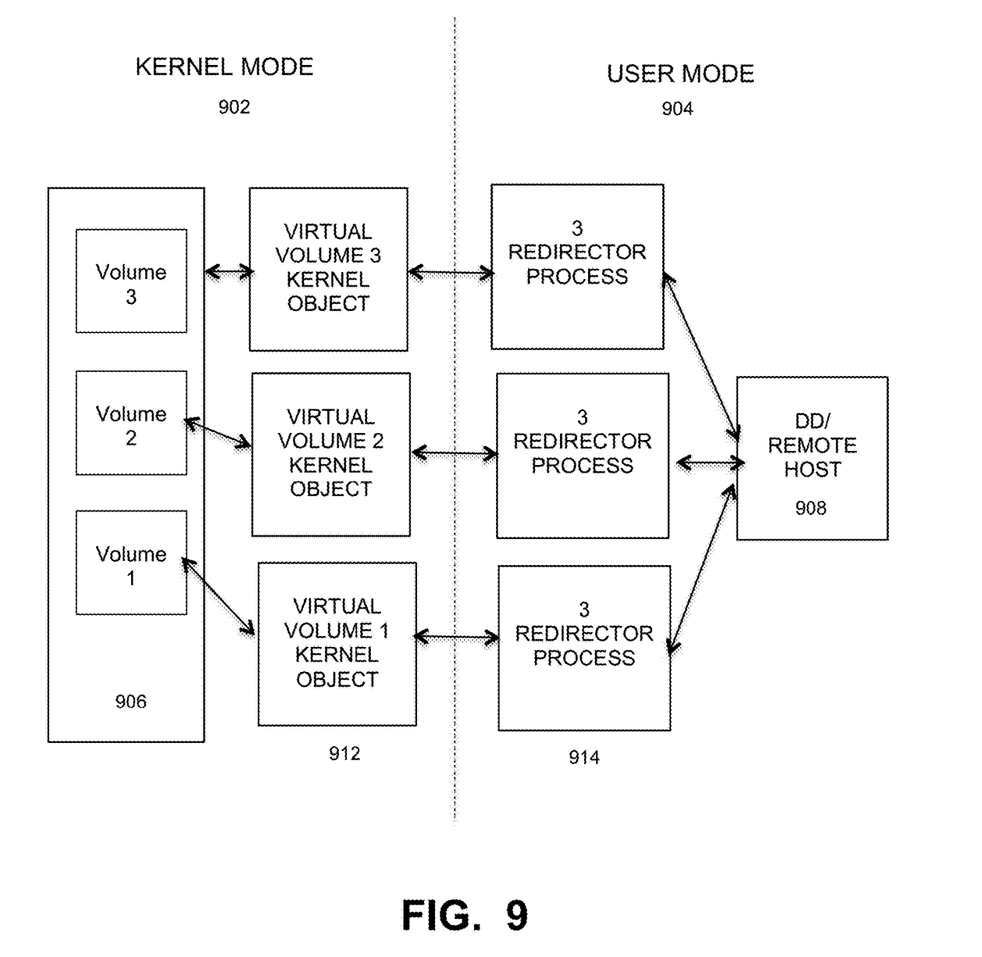
FIG. 9 illustrates a system in which a virtual disk contains multiple volume partitions.

In some embodiments, a double mount technique may be used for mounting VM files. With regard to double mount, when a VHDX file, which is a representation of a disk contains more than one volume, granular recovery (GLR) involves additional system complexity and overhead. To solve this, the differencing disk in the local machine that points to the last file of the incremental chain is mounted using native operating system mount, such as AVHD4 in FIG. 8. The embodiment illustrated in FIG. 3 illustrates an example case of a VHD/VHDx having one partition/volume within the disk. In many cases, a VHD/VHDx can have more than one partition/volume inside the disk. FIG. 9 illustrates a system in which a virtual disk contains multiple volume partitions. Specifically FIG. 9 shows a virtual disk 906 containing three volume partitions (denoted Volume 1, Volume 2, and Volume 3) to be represented by a GLR (granular level recovery) method, such that it requires additional system complexity and overhead. Since VHD/VHDx is a disk image format representing it as a disk instead of volume to the client machines is more correct. In the kernel side 902, each volume is associated with a respective corresponding virtual volume kernel object 912. For each kernel object a corresponding redirector process 914 is provided in the user mode 904, and each redirector process interfaces with the DD/remote host 908.

In FIG. 9 it can be seen that additional resources are required if more than one volume is present on the virtual disk. The solution is to create a differencing disk in the local machine that points to the last file of the incremental chain and mount it using native OS mount. The native OS mounts the VHD/VHDx like any other file but the enumeration of volumes everything the OS handles correctly. This solution also makes easier to handle write requests since writes are redirected to the differencing disk file. In the above example a differencing disk file is created on the local machine that points to the last file in the chain.

Redirection/Emulation Process

With reference back to FIG. 6A, it can be seen that the second main step 604 of the process is to setup the kernel mode interceptor hook system object and the user mode process for redirection. The virtual volume created and the file extents table is passed as an input to the user mode process. The user mode process waits for events triggered by the kernel mode driver object. In case of Read/Write I/O the offset and the length parameters are used to determine whether the I/O is within the file boundary by looking at the extent table. If yes then it will further convert it to file relative extent and read from the remote storage node using DDBOOST in case of DD machine or NFS client library if the remote machine is NFS server. Handling of write requests is automatically accomplished by attaching a differencing disk created on the local machine to the last known incremental file and performing a native OS mount of that file.

Figure 10:
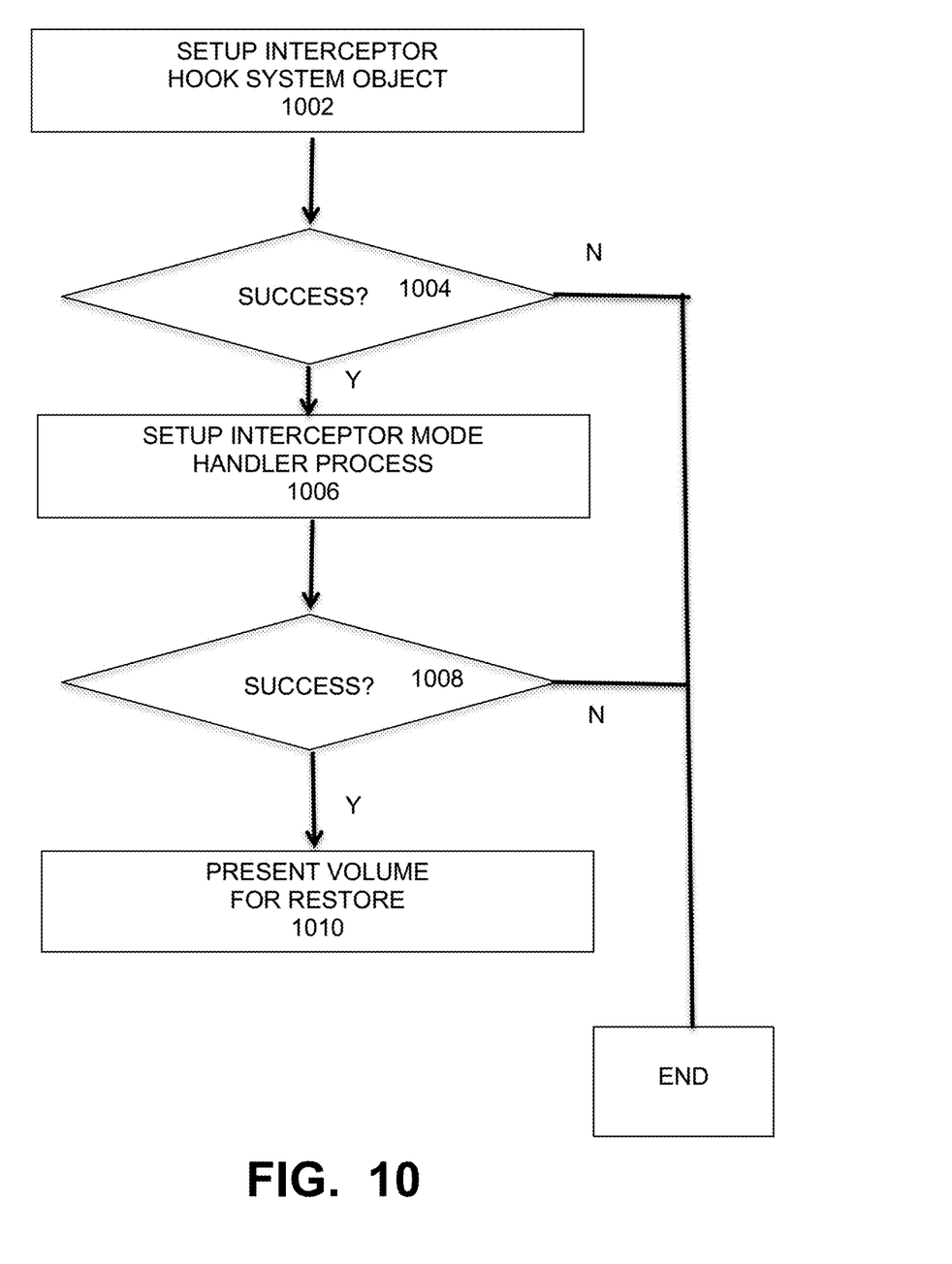
FIG. 10 is a flowchart illustrating a method of setting up kernel and user mode interceptor components, under an embodiment.

FIG. 10 is a flowchart illustrating a method of setting up kernel and user mode interceptor components, under an embodiment. The process first sets up the interceptor hook system object, step 1002. If this object is not successfully set up as determined in step 1004, the process ends. Otherwise once that object is set up, the process next sets up the interceptor mode handler process, step 1006. If this process is not successfully set up as determined in step 1008, the process ends. Otherwise with both interceptor components set up, the process presents the volume for the restore operation, step 1010.

Figure 11:
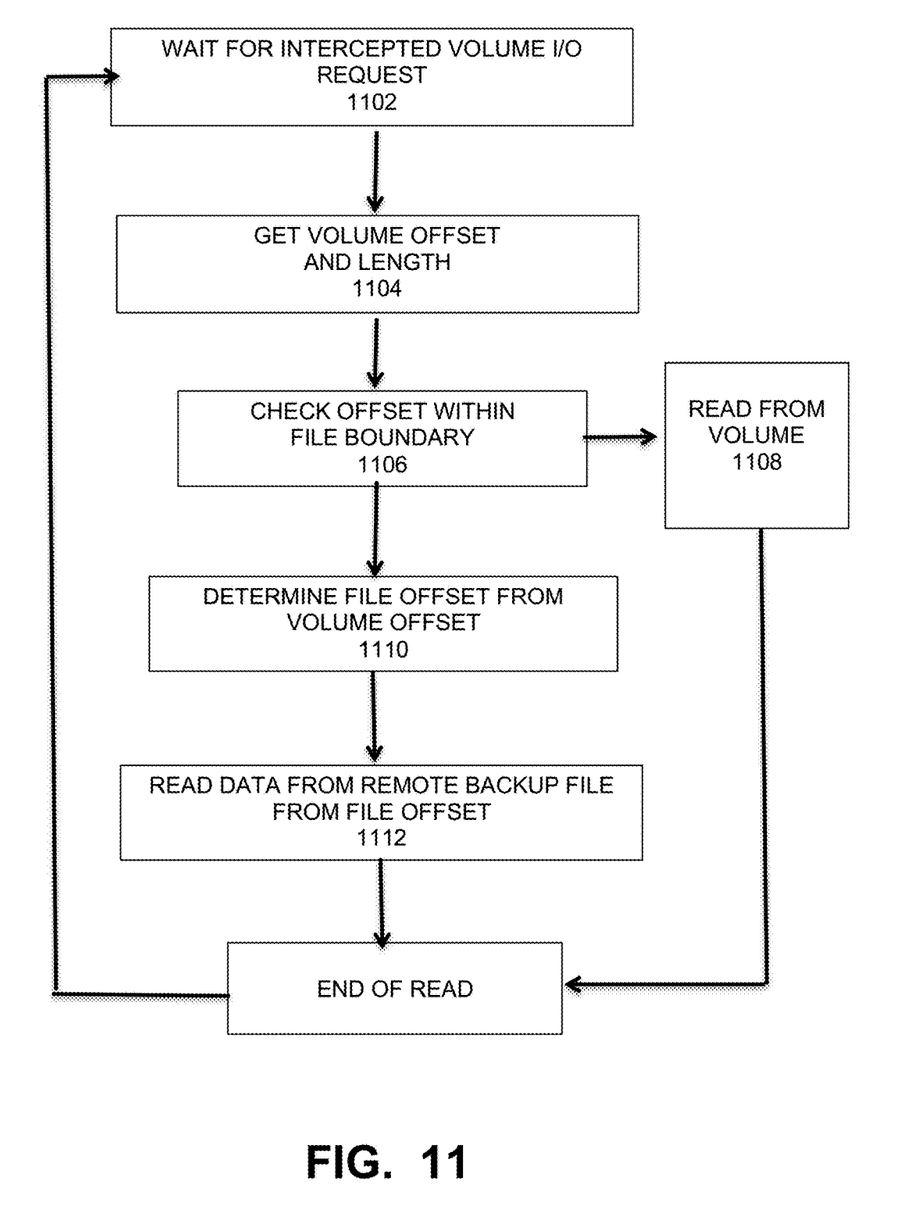
FIG. 11 shows a flow for processing a backup of a file into a VHD/VHDx stream, under an embodiment.

FIG. 11 is a flowchart that illustrates a method of processing the backup of a file to a VHD/VHDx format stream after operation of the interceptor components of FIG. 10. In step 1102, the system waits for an intercepted I/O request, such as a Read/Write (R/W) operation. In step 1104, the volume offset and length are obtained, and then a check is made as to whether the offset is within the file boundary, 1106. If the offset is not within the file boundary, in a step 1108, a read is made of the volume (e.g., the virtual volume). The read operation then ends and the process may loop back to the start of a next read based on another intercepted volume I/O request. Alternatively, if the offset is within the file boundary, in a step 1110, a determination is made of the file offset from the volume offset. The flow then proceeds to step 1112 in which data is read from the remote backup file from the file offset (e.g., a read of the data block of the file to be backed up).

Some benefits of embodiments of the system described herein include the ability to mount the resulting backup image directly using, for example, the standard Microsoft Windows VHD/VHDx mount API; support for any target media in addition to disk-based as the backup is stream-based; support for file level restores in the case of a non-disk medium such as tapes provided extents are known; instant access of the backup file to the host in a native file system with recovery being instantaneous; no need to hop through for recovery; and the backed up file can be exposed directly to any host to help ensure that recovery time objectives (RTO) are met. Further advantages of the disclosed embodiments include: instant presentation of virtual machine backup file to the host in native file system and recovery is instantaneous; no need to hop through for recovery; ability to expose the file directly to any host hence RTO objectives are met; perform restoration many times faster than the legacy restore; takes advantage of native OS mount capabilities; and providing efficient R/W mount of virtual machine hard disk files.

Although embodiments have been described with respect to certain file systems, such as NFS, CIFS, NTFS, and the like, it should be noted that embodiments are not so limited and other alternative file systems may also be used in conjunction with the described embodiments. Similarly different operating systems, hypervisor platforms, and data storage architectures may utilize different implementations or configurations of the described embodiments.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing virtual machine backup files for instant system restoration, comprising:
   setting up a kernel mode interceptor hook system object and a user mode redirector process;
   presenting a backed up save set comprising a virtual disk in a backup system including a backup server computer and virtual machine targets;
   creating a temporary container in a storage medium coupled to the backup server computer;
   formatting the temporary container with a directory structure similar to that created for the virtual disk during backup;
   receiving read operations (reads) to the backup save set intercepted by the kernel interceptor hook system object of the backup server computer,
   redirecting, using the kernel mode redirector component, reads to the backup save set residing either on one of a deduplication backup platform or a network file system; and
   servicing the read operations through a user mode read thread to use file transfer protocol (FTP) libraries to mount arbitrary disk images on defined operating system platforms to ensure availability of the backup save set without requiring file share protocols to access a remote virtual machine hard disk files and without changing the original backup save set format.

2. The method of claim 1 wherein the servicing comprises servicing the read operations in an image mount driver operating in a user mode and not a kernel mode, and wherein the user mode read thread comprises a file-based application programming interface (API).

3. The method of claim 2 further comprising performing a virtual disk mount operation in a mount process native to an operating system of a host computer of the backup system.

4. The method of claim 3 wherein the virtual disk comprising a VM is formatted in a VHD/VHDx format.

5. The method of claim 4 further comprising using a VHD image mount driver of the operating system, and wherein the mount operation comprises one of a single mount or a double mount.

6. The method of claim 5 wherein the double mount is used for instances where a disk contains more than one volume and includes a granular recovery (GLR) process.

7. The method of claim 6 further comprising utilizing a differencing disk in the host computer that points to a last file of an incremental backup chain.

8. A computer-implemented method of facilitating performing an instant restore of files backed up to target virtual machines in a backup system including a backup server computer and the target virtual machines, comprising:
creating, using a backup storage server process and in a storage medium coupled to the backup server computer, a virtual volume with emulated files that emulate the files backed up to the target virtual machines;
providing an executable interceptor object in the backup server computer operating on a kernel side for intercepting input/output (I/O) operations to and from the target virtual machines and triggering an I/O event based on any interception;
providing a redirector process operating on a user side to wait for events triggered by the interceptor object to re-direct the read I/O operations to the emulated files; and
servicing the read I/O operations through a user mode read thread to use file transfer protocol (FTP) libraries to mount arbitrary disk images on defined operating system platforms to ensure availability of the backup save set without requiring file share protocols to access a remote virtual machine hard disk files and without changing an original format of the files backed up.

9. The method of claim 8 wherein the step of creating the virtual volume comprises:
identifying a source file, stored in a volume of a client, for backup in a mountable format to a target virtual machine through the backup storage server;
creating on the client a template virtual volume that corresponds to the volume of the client in which the file is stored;
identifying a set of file extents occupied by the file to be backed up;
creating a backup stream from the template virtual volume;
when a file extent from the backup stream is not within the set of file extents, accessing the template virtual volume to backup a data block associated with the template virtual volume; and
when the file extent is within the set of file extents, accessing the file to backup a data block associated with the file.

10. The method of claim 9 wherein the creating on the client a template virtual volume that corresponds to the volume of the client in which the virtual hard disk file is stored comprises:
formatting the template virtual volume with a file system of the volume;
creating within the template virtual volume a template file having a size that matches a size of the file to be backed up; and
creating within the template virtual volume a directory structure that matches a directory structure of the file to be backed up.

11. The method of claim 10 further comprising:
storing the set of file extents in a file extents table; and
passing the template virtual volume and the file extents table as an input to the user side redirector process.

12. The method of claim 11 wherein the I/O operations comprise one or more read requests or one or more write requests to a target virtual machine serving as a remote storage node.

13. The method of claim 12 further comprising executing the read or write requests automatically by attaching a differencing disk created on the backup storage server to a last known incremental backup file and performing a mount of the last known incremental backup file using a mount operation native to an operating system of the backup storage server.

14. The method of claim 13 wherein the volume of a client comprises a plurality of volumes, the method further comprising:
creating a respective virtual volume kernel object for each volume of the plurality of volumes;
creating corresponding redirector processes for each respective virtual volume kernel object; and
processing source data from each volume of the plurality of volumes to a single volume on the remote storage node.

15. A computer program product, comprising a non-transitory computer-readable medium having a computer-readable program code embodied therein, the computer-readable program code adapted to be executed by one or more processors to provide virtual machine backup files for instant system restoration by executing instructions implementing a method comprising:
setting up a kernel mode interceptor hook system object and a user mode redirector process;
presenting a backed up save set comprising a virtual disk in a backup system including a backup server computer and virtual machine targets;
creating a temporary container in a storage medium coupled to the backup server computer;
formatting the temporary container with a directory structure similar to that created for the virtual disk during backup;
receiving read operations (reads) to the backup save set intercepted by the kernel interceptor hook system object of the backup server computer,
redirecting, using the kernel mode redirector component, reads to the backup save set residing either on one of a deduplication backup platform or a network file system; and
servicing the read operations through a user mode read thread to use file transfer protocol (FTP) libraries to mount arbitrary disk images on defined operating system platforms to ensure availability of the backup save set without requiring file share protocols to access a remote virtual machine hard disk files and without changing the original backup save set format.

16. The computer program product of claim 15 wherein the servicing comprises servicing the read operations in an image mount driver operating in a user mode and not a kernel mode, and wherein the user mode read thread comprises a file-based application programming interface (API).

17. The computer program product of claim 15 further comprising instructions for performing a virtual disk mount operation in a mount process native to an operating system of a host computer of the backup system.

18. The computer program product of claim 17 wherein the virtual disk comprising a VM is formatted in a VHD/VHDx format.

19. The computer program product of claim 18 further comprising using a VHD image mount driver of the operating system, and wherein the mount operation comprises one of a single mount or a double mount.

\* \* \* \* \*